United States Patent
Zheng et al.

(10) Patent No.: US 8,121,446 B2
(45) Date of Patent: Feb. 21, 2012

(54) MACRO-CHIP INCLUDING A SURFACE-NORMAL DEVICE

(75) Inventors: Xuezhe Zheng, San Diego, CA (US); Ashok V. Krishnamoorthy, San Diego, CA (US); John E. Cunningham, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 329 days.

(21) Appl. No.: 12/566,101

(22) Filed: Sep. 24, 2009

(65) Prior Publication Data

US 2011/0069925 A1    Mar. 24, 2011

(51) Int. Cl.
*G02B 6/12* (2006.01)
*G02B 6/26* (2006.01)
*G02B 6/36* (2006.01)

(52) U.S. Cl. ............................. 385/14; 385/15; 385/88

(58) Field of Classification Search .................. None
See application file for complete search history.

(56) References Cited

U.S. PATENT DOCUMENTS

| 7,932,515 B2 * | 4/2011 | Bunyk | 257/31 |
| 2007/0104412 A1 * | 5/2007 | Hsu | 385/14 |

* cited by examiner

*Primary Examiner* — Tina Wong
(74) *Attorney, Agent, or Firm* — Park, Vaughan, Fleming & Dowler LLP

(57) ABSTRACT

A multi-chip module (MCM) is described. This MCM includes two substrates having facing surfaces. Disposed on a surface of a first of these substrates, there is an optical waveguide, having an eigenmode in the plane of the surface, and an optical coupler, which redirects optical signals to and/or from the optical waveguide and a direction normal to the surface. Furthermore, disposed on a surface of a second of the substrates, which faces the surface of the first substrate, and which overlaps the optical coupler, there is an optoelectronic device. This optoelectronic device, which has an eigenmode in a direction perpendicular to the surface of the second substrate, selectively receives or provides the optical signal to and/or from the optical coupler. For example, the selective receiving or providing may be controlled by selectively applying a potential to the quantum-well device, thereby changing the optical properties of the optoelectronic device.

20 Claims, 6 Drawing Sheets

MACRO-CHIP INCLUDING A SURFACE-NORMAL DEVICE

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to techniques for communicating optical signals. More specifically, the present disclosure relates to a multi-chip module (MCM) that includes a device having an optical eigenmode normal to a surface of the device.

2. Related Art

Engineers have recently proposed using a multi-chip module (MCM) (which is sometimes referred to as a 'macro-chip') to integrate a collection of semi-conductor chips together. This MCM offers unprecedented: computational density, energy efficiency, bisection bandwidth and reduced message latencies. These characteristics are obtained by photonically interconnecting multiple silicon chips into a logically contiguous piece of silicon, thereby integrating: multi-core, multi-threaded processors, system-wide interconnects and dense memories.

As shown in FIG. 1, in one configuration of proposed MCM 100, hybrid chips, including island chips 110 (such as memory and/or one or more processor cores) and photonic bridge chips 112, are arranged in a two-dimensional, multi-tiered array. In this MCM, an upward-facing island chip (such as island chip 110-1) in the lower tier in MCM 100 is coupled to a downward facing bridge chip (such as bridge chip 112-1) in the upper tier. In particular, in the regions where these chips overlap (indicated by the fine dashed lines in FIG. 1), communication occurs via proximity communication of electromagnetically coupled signals (which is referred to as 'electromagnetic proximity communication'). For example, the proximity communication may include: communication of capacitively coupled signals (electrical proximity communication') and/or communication of optical signals (such as 'optical proximity communication' or OPxC). Consequently, bridge chips 112 may include optical transmitter and receiver circuits, as well as capacitive-proximity-communication circuitry. In addition, bridge chips 112 may include one or more processor cores and/or memory.

Bridge chips 112 in MCM 100 may communicate with each other using optical links. In particular, there may be: optical waveguides 114 in the upper tier, optical waveguides 116 in the lower tier (for example, in a base or routing chip, which is obscured by island chips 110 and bridge chips 112 in FIG. 1), and waveguide-based silicon photonic devices, such as: modulators, receivers, wavelength-division-multiplexing multiplexers and wavelength-division-multiplexing de-multiplexers. Therefore, communication between bridge chips 112 may occur via OPxC with: optical waveguides 114, optical waveguides 116 and/or island chips 110.

In order to ensure reliable, low-power, low bit error rate off-chip communication, bridge chips 112 typically need to be positioned with a lateral accuracy that is a fraction of the optical mode size used in the OPxC. Furthermore, this chip-to-chip separation typically needs to be controlled to within a few microns to ensure the fidelity of the communication channels. Additionally, the chip alignment needs to be maintained while providing power to and removing heat from the components in MCM 100.

A variety of techniques have been proposed to implement OPxC between face-to-face chips, such as: grating-coupler based OPxC, reflecting-mirror based OPxC, and OPxC using ball lenses in etch pits. However, all these techniques usually require very accurate vertical and lateral alignment. Furthermore, while the etch-pit and ball-lens technique can potentially provide the accurate alignment needed for reliable OPxC, thermal expansion remains a concern. In addition, in order to accommodate the waveguide-based optical modulators and photo-detectors, bridge chips 112 are typically fabricated using silicon-on-insulator (SOI) process technology. However, this process technology is expensive, which increases the cost of bridge chips 112.

Hence, what is needed is an MCM without the above-described problems.

SUMMARY

One embodiment of the present disclosure provides a multi-chip module (MCM) that includes a first substrate having a first surface and a second substrate having a second surface. The first substrate includes a number of features disposed on the first surface, including: a first optical waveguide having an eigenmode in the plane of the first surface; and a first optical coupler, optically coupled to the first optical waveguide, which redirects an optical signal to and/or from the first optical waveguide and a direction normal to the first surface. Furthermore, the second surface, which faces the first surface, and which overlaps the first optical coupler, includes a first optoelectronic device. This first optoelectronic device has an eigenmode in a direction perpendicular to the second surface, and selectively receives or provides the optical signal to and/or from the first optical coupler.

In some embodiments, the first optoelectronic device includes a quantum-well device. For example, the quantum-well device may include layers of germanium (Ge) separated by silicon-germanium (SiGe) layers. Moreover, the quantum-well device may include an electro-absorption device, such as a quantum confined Stark effect (QCSE) device.

Note that the first substrate may include silicon, and the first optical waveguide may be fabricated using a silicon-on-insulator (SOI) process technology. Furthermore, the second substrate may include silicon. However, the second substrate may include a semiconductor process technology other than SOI process technology.

Furthermore, the first optoelectronic device may include an optical detector.

Additionally, the MCM may facilitate selective inter-chip communication between the first substrate and the second substrate.

In some embodiments, the first substrate includes, on the first surface: a second optical waveguide having an eigenmode in the plane of the first surface; and a second optical coupler, optically coupled to the second optical waveguide, which redirects the optical signal to and/or from the direction normal to the first surface and the second optical waveguide. Note that the second substrate overlaps the second optical coupler. Furthermore, the first optoelectronic device selectively optically couples the optical signal to and/or from the first optical coupler and the second optical coupler. In this way, the MCM may facilitate selective intra-chip communication on the first substrate.

Note that a given optical coupler, which can be the first optical coupler or a second optical coupler, may include a mirror and/or a diffraction grating.

Additionally, in some embodiments the first substrate includes, on the first surface, a third optical coupler, which is optically coupled to the second optical waveguide at an opposite end of the optical waveguide than the second optical coupler. This third optical coupler may redirect the optical signal to and/or from the second optical waveguide and the direction normal to the first surface. Furthermore, the MCM may include a third substrate having a third surface, which faces the first surface and which overlaps the third optical coupler. A second optoelectronic device, having an eigenmode in a direction perpendicular to the third surface, and which is disposed on the third surface, may selectively receive or provide the optical signal to and/or from the third optical coupler.

Another embodiment provides a system that includes the MCM.

Another embodiment provides a method for selectively receiving an optical signal using the MCM. During operation, the first optical waveguide disposed on the first surface on the first substrate in the MCM receives the optical signal, where the first optical waveguide has an eigenmode in the plane of the first surface. Then, the first optical coupler on the first surface redirects the optical signal from the first optical waveguide to the direction normal to the first surface. Next, the first optoelectronic device disposed on a second surface of a second substrate in the MCM, where the second surface that faces the first surface and the second substrate overlaps the first optical coupler, selectively receives the optical signal. Note that the first optoelectronic device has an eigenmode in a direction perpendicular to the second surface.

Another embodiment provides a method for selectively providing an optical signal using the MCM. During operation, the first optoelectronic device disposed on a first surface of a first substrate in the MCM selectively provides the optical signal. Note that the first optoelectronic device has an eigenmode in a direction perpendicular to the first surface. Then, the first optical coupler, disposed on a second surface of a second substrate in the MCM, redirects the optical signal from the direction to the first waveguide disposed on the second surface, where the second surface faces the first surface. This first waveguide has an eigenmode in the plane of the second surface. Next, the first optical waveguide receives the optical signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
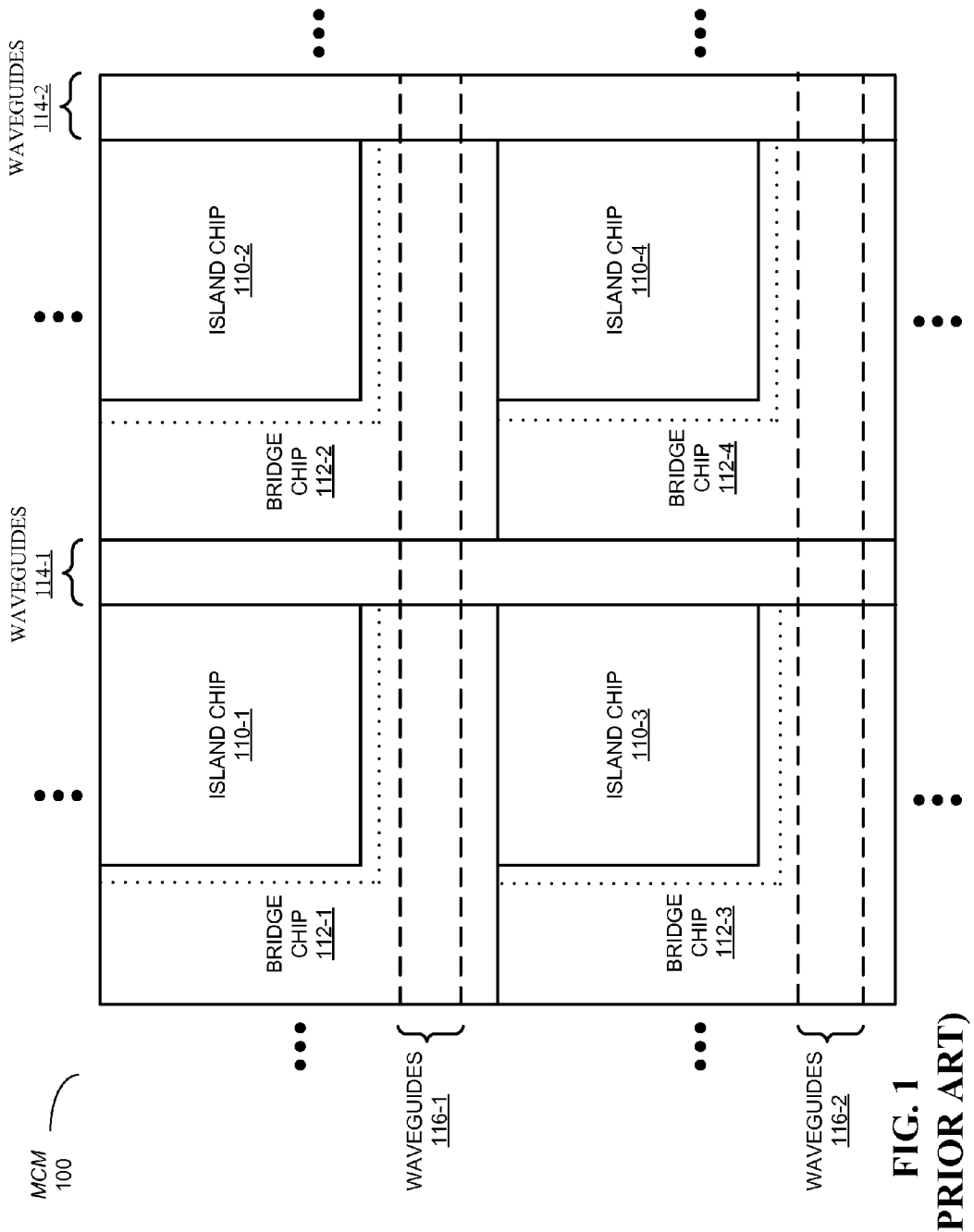
FIG. 1 is a block diagram illustrating an existing multi-chip module (MCM).

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a multi-chip module (MCM), a system that includes the MCM, and a technique for selectively receiving or providing an optical signal using the MCM are described. This MCM includes two substrates having facing surfaces. Disposed on a surface of a first of these substrates, there is an optical waveguide, having an optical eigenmode in the plane of the surface, and an optical coupler, which redirects optical signals to and/or from the optical waveguide and a direction normal to the surface. Furthermore, disposed on a surface of a second of the substrates, which faces the surface of the first substrate, and which overlaps the optical coupler, there is an optoelectronic device. This optoelectronic device, which has an optical eigenmode in a direction perpendicular to the surface of the second substrate, selectively receives or provides the optical signal to and/or from the optical coupler. For example, the optoelectronic device may include a quantum-well device, such as an electro-absorption device, and the selective receiving or providing may be controlled by selectively applying a potential to the quantum-well device, thereby changing the optical properties of the optoelectronic device.

By selectively coupling the optical signals using the optoelectronic device, the cost and the complexity of the MCM may be reduced. In particular, the optoelectronic device can include optical components (such as photo-detectors), as well as circuits (such as a processor core), on a silicon substrate without using a silicon-on-insulator (SOI) process technology. Consequently, bridge chips 112 may be implemented using standard CMOS chips. In addition, the optoelectronic device (which is sometimes referred to as a 'surface-normal' device) may significantly relax the lateral alignment tolerance in a macro-chip that includes the MCM.

We now describe embodiments of an MCM. As discussed previously, MCM 100 includes components, such as bridge chips 112, which include circuits and waveguide-based devices. These components are typically implemented using SOI process technology. For example, the circuits may be implemented using CMOS on SOI, while the waveguides in the waveguide-based devices may be implemented using SOI. In addition, this macro-chip has very strong alignment requirements between bridge chips 112 and the routing chip to ensure reliable communication. However, the use of SOI process technology, and the strong alignment required, increase the cost of the components, and thus, the cost of MCM 100.

Figure 2:
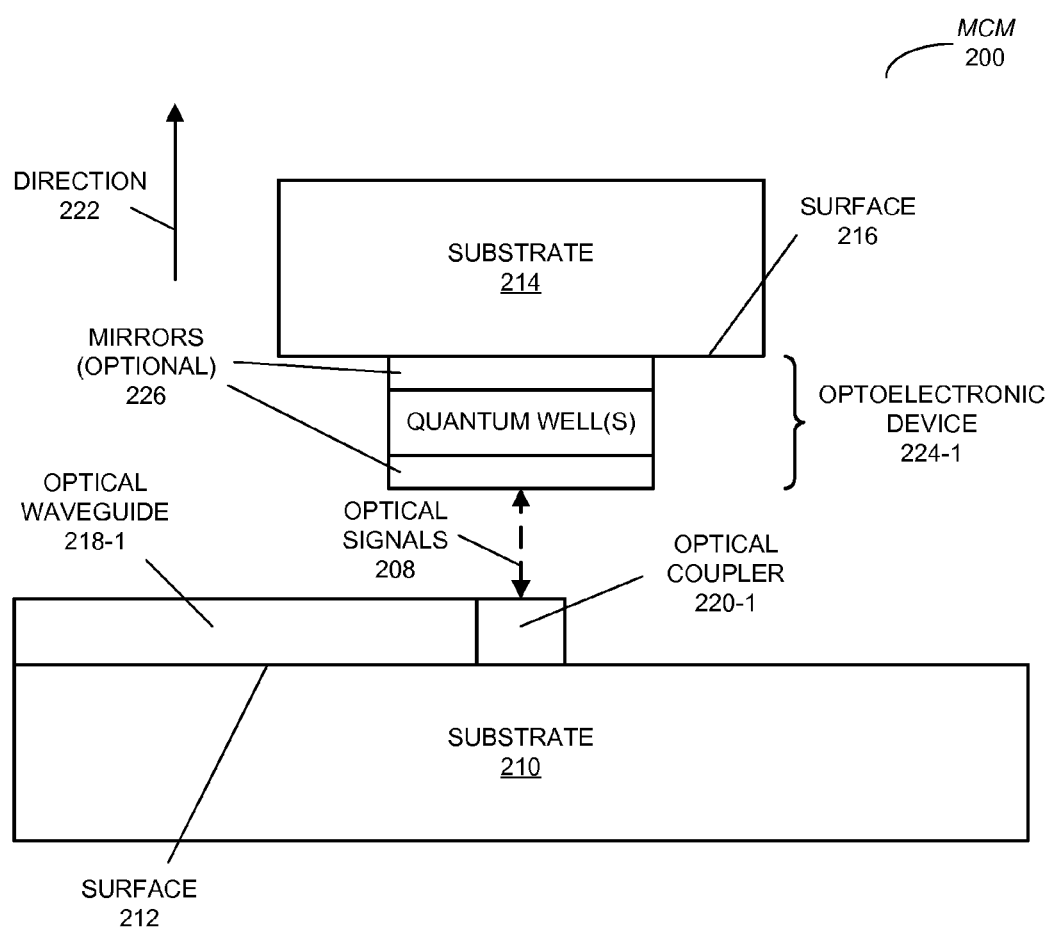
FIG. 2 is a block diagram illustrating an MCM in accordance with an embodiment of the present disclosure.

FIG. 2 presents a block diagram illustrating a cross-sectional view of MCM 200 that, at least in part, addresses these problems. This MCM includes a substrate 210 having a surface 212, and a substrate 214 having a surface 216. Disposed on the surface 212, substrate 210 includes: an optical waveguide 218-1 having an optical eigenmode in the plane of surface 212; and an optical coupler 220-1 (such as a mirror and/or a diffraction grating), optically coupled to optical waveguide 218-1, which redirects one or more optical signals 208 to and/or from optical waveguide 218-1 and a direction 222 normal to surface 212. Furthermore, surface 216, which faces surface 212, and which overlaps optical coupler 220-1, includes an optoelectronic device 224-1. This optoelectronic device has an optical eigenmode in direction 222 (which is also normal to surface 216), and selectively receives or provides the one or more optical signals 208 to and/or from optical coupler 220-1. (Thus, optical coupler 220-1 may be a light emitter and/or a light collector.)

In some embodiments, optoelectronic device 224-1 includes a quantum-well device. For example, the quantum-well device may include layers of germanium (Ge) separated by silicon-germanium (SiGe) layers. Moreover, the quantum-well device may include an electro-absorption device, such as a quantum confined Stark effect (QCSE) device. However, a wide variety of surface-normal devices may be used in optoelectronic device 224-1. In addition, in some embodiments optoelectronic device 224-1 includes optional mirrors 226.

By including optoelectronic device 224-1, substrate 214 may be silicon, and devices and circuits may be implemented on substrate 214 without using an SOI process technology. This may significantly reduce the cost of this component. In contrast, substrate 210 may be silicon, and optical waveguide 218-1 may be implemented on substrate 210 using an SOI process technology.

Note that MCM 200 may facilitate selective inter-chip communication between substrate 210 and substrate 214. In particular, this configuration may allow the one or more optical signals 208 to be directly coupled from one chip to the other using OPxC.

Figure 3:
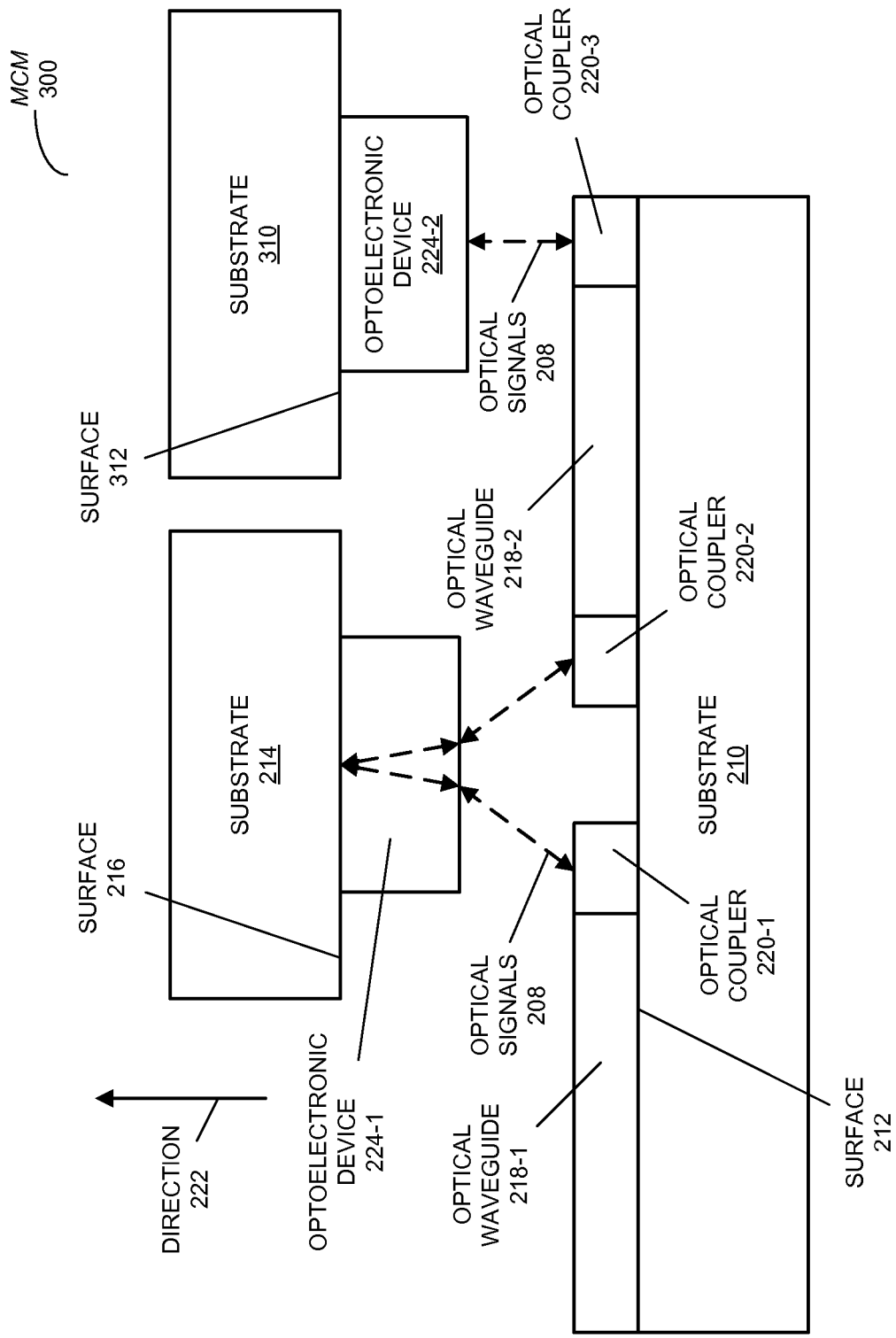
FIG. 3 is a block diagram illustrating an MCM in accordance with an embodiment of the present disclosure.

FIG. 3 presents a block diagram illustrating a cross-sectional view of MCM 300. In this MCM, disposed on surface 212, substrate 210 includes: an optical waveguide 218-2 having an optical eigenmode in the plane of surface 212; and optical coupler 220-2, optically coupled to the second optical waveguide, which redirects at least components of the one or more optical signals to and/or from direction 222 and optical waveguide 218-2. Note that substrate 214 overlaps optical coupler 220-2. Furthermore, optoelectronic device 224-1 selectively optically couples the one or more optical signals 208 to and/or from optical coupler 220-1 and optical coupler 220-2. In this way, MCM 300 may facilitate selective intra-chip communication on substrate 210.

In some embodiments, disposed on surface 212, substrate 210 includes optical coupler 220-3, which is optically coupled to optical waveguide 218-2 at an opposite end of optical waveguide 218-2 than optical coupler 220-2. This optical coupler may redirect the one or more optical signals 208 to and/or from optical waveguide 218-2 and direction 222. Furthermore, MCM 300 may include substrate 310 having surface 312, which faces surface 212 and which overlaps optical coupler 220-3. Optoelectronic device 224-2, having an optical eigenmode in direction 222, and which is disposed on surface 312, may selectively receive or provide the one or more optical signals 208 to and/or from optical coupler 220-3. Note that in some embodiments optoelectronic devices 224-1 and/or 224-2 include an optical detector.

As noted previously, in some embodiments optoelectronic devices 224 include a QCSE device. QCSE is a strong electro-absorption mechanism that can be used in high-speed, low-power and compact optoelectronic devices, for example, using III-V materials.

Recently, QCSE in SiGe/Ge quantum wells has been demonstrated, and SiGe/Ge optoelectronic modulators, and waveguide detectors and links employing the QCSE have been reported on silicon. An electro-absorption device based on the QCSE in a multiple quantum-well device based on Ge quantum wells separated by SiGe barriers offers a much stronger electro-optic effect than a depletion-based silicon modulator. Furthermore, broadband operation with a low driver voltage can potentially be achieved with SiGe/Ge QCSE devices. In addition, these same QCSE devices can be used as either modulators or photo-detectors.

However, it can be challenging to make waveguide QCSE devices because epitaxial growth is needed to grow the multilayer quantum-well structure for the QCSE devices. On the other hand, surface-normal devices can be made naturally. Taking advantage of the vertical optical couplers 220 (i.e., OPxC) in quantum MCMs 200 (FIG. 2) and 300, these surface-normal modulators and photo-detectors can be used for interconnects with significantly reduced alignment requirements than other OPxC techniques between face-to-face chips.

Moreover, these MCMs (which may contain the surface-normal QCSE devices) may be used in a macro-chip to facilitate the vertical coupling between bridge chips 112 (FIG. 1) and the routing chip. (Thus, substrate 210 may be the routing chip, and substrate 214 may be a bridge chip.) For example, a bridge chip that includes one or more surface-normal devices may be placed face-to-face with a silicon photonic routing chip. Furthermore, as shown in FIGS. 2 and 3, the surface-normal device may be aligned with one or more vertical optical couplers 220.

During operation, an optical signal in a waveguide (such as one of waveguides 116-1 in FIG. 1) in the routing chip may be vertically reflected to a surface-normal QCSE device on a bridge chip (such as bridge chip 112-1) by a vertical optical coupler (such as a grating coupler). After modulation, the optical signal may be reflected back to another vertical optical coupler, and then coupled back to an output waveguide on the routing chip.

Alternatively, for light detection, the QCSE device absorbs the light and converts it to electrical signal. Consequently, no coupling back to the routing chip is needed.

Note that the gap between a bridge chip and the routing chip may be determined by the coupling angle of the vertical optical coupler, and the horizontal distance between the pair of vertical optical couplers. Because of a QCSE device's parallel-plate structure, the lateral alignment in this case may not be critical at all as long as the optical beam is within the aperture of the QCSE device. Thus, in this approach, the only parameter that needs to be accurately controlled may be the gap. For example, the gap may be carefully set using ball-and-pit technology, or using one or more accurate spacers. Moreover, given an aperture size of the tens of microns, which is typically for QCSE devices, a pick-and-place machine can be used to position bridge chips 112 (FIG. 1). Consequently, in a macro-chip, integrating the QCSE surface-normal modulators and photo-detectors on bridge chips 112 (FIG. 1) can significantly reduce the alignment requirements.

Therefore, viewing MCM 300 in a macro-chip, two chip sites (such as substrates 210 and 310) may be interconnected via a routing chip (i.e., substrate 214) using vertical optical couplers 220. Each of these sites may correspond to an island chip with an electrically bonded bridge chip, which contains the surface-normal QCSE devices, directly interfacing with the vertical optical couplers 200 on the routing chip.

While FIG. 3 illustrates two sites, more sites can be interconnected using this technique. Furthermore, the routing chip may contain more than one layer to support a more complicated wavelength-division-multiplexing network to interconnect multiple bridge chips. Additionally, OPxC can be used to avoid optical-waveguide crossing. However, as noted previously, bridge chips 112 (FIG. 1) that include QCSE surface-normal devices may not need to include optical waveguides.

Figure 4:
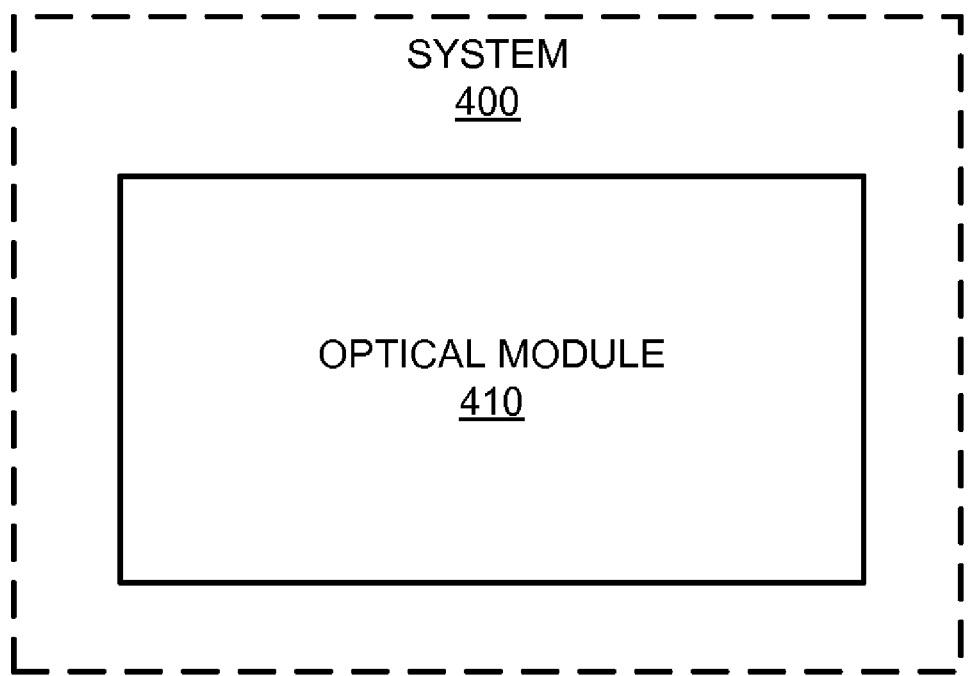
FIG. 4 is a block diagram illustrating a system in accordance with an embodiment of the present disclosure.

While the preceding embodiments have used the macrochip as an illustrative example, the embodiments of the MCM may be used in a wide variety of applications. Thus, this selective optical-coupling technique may be used in an arbitrary multi-chip interconnect in an arbitrary system. This is shown in FIG. 4, which presents a block diagram illustrating a system 400 that includes MCM 410. In general, an MCM may include an array of chip modules (CMs) or single-chip modules (SCMs), and a given SCM may include at least one substrate, such as a semiconductor die. Furthermore, the substrate may communicate with other substrates, CMs, SCMs, and/or optical devices in the MCM using: electrical proximity communication, optical proximity communication, proximity communication of inductively coupled signals, and/or proximity communication of conductively coupled signals.

Furthermore, embodiments of the MCM may be used in a variety of applications, including: VLSI circuits, communication systems (such as in wavelength division multiplexing), storage area networks, data centers, networks (such as local area networks), and/or computer systems (such as multiple processor-core computer systems). For example, an MCM may be included in a backplane that is coupled to multiple processor blades, or an MCM may couple different types of components (such as processors, memory, I/O devices, and/or peripheral devices). In some embodiments, an MCM performs the functions of: a switch, a hub, a bridge, and/or a router.

Note that system 400 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

MCM 200 (FIG. 2), MCM 300 (FIG. 3) and/or system 400 may include fewer components or additional components. For example, there may be one or more additional substrates in FIG. 3 that function as intermediate relay chips, i.e., which couple the one or more optical signals 208 to and/or from substrate 310 (FIG. 3).

Furthermore, although the MCMs in FIGS. 2 and 3 are illustrated as having a number of discrete items, these optical modules are intended to be functional descriptions of the various features that may be present rather than structural schematics of the embodiments described herein. Consequently, in these embodiments two or more components may be combined into a single component, and/or a position of one or more components may be changed.

In some embodiments, substrates 210, 214 and/or 310 (FIGS. 2 and 3) include additional components, such as: an optical source (such as a laser), a modulator, a multiplexer (such as an add filter), a de-multiplexer (such as a drop filter), an amplifier, a filter, and/or a switch. These components may be implemented using optical and/or electrical circuits or components. Moreover, note that a given substrate may be a semiconductor (such as silicon), glass or sapphire, and these components and devices on the given substrate may be fabricated using a variety of fabrication techniques, as is known to one of skill in the art.

Figure 5:
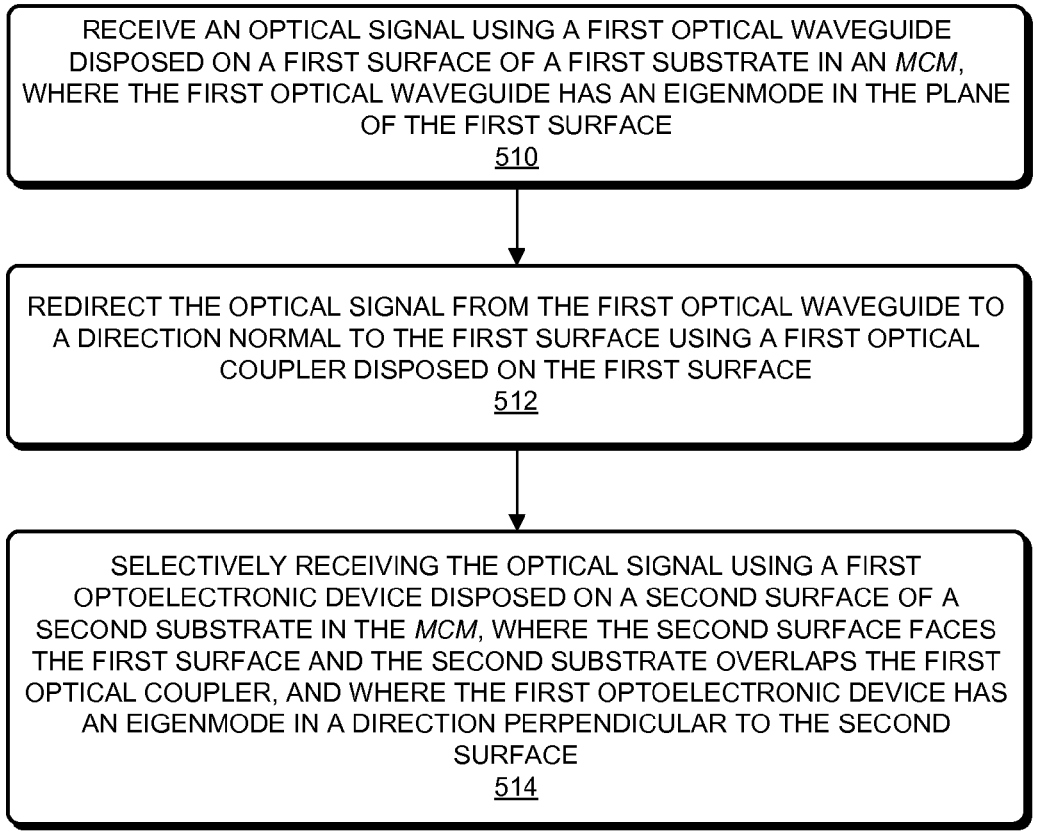
FIG. 5 is a flow chart illustrating a process for selectively receiving an optical signal using an MCM in accordance with an embodiment of the present disclosure.

We now describe embodiments of a process. FIG. 5 presents a flow chart illustrating a process 500 for selectively receiving an optical signal using an MCM, such as MCM 200 (FIG. 2) or MCM 300 (FIG. 3). During operation, a first optical waveguide disposed on a first surface on a first substrate in the MCM receives the optical signal (operation 510), where the first optical waveguide has an eigenmode in the plane of the first surface. Then, a first optical coupler disposed on the first surface redirects the optical signal from the first optical waveguide to a direction normal to the first surface (operation 512). Next, a first optoelectronic device disposed on a second surface of a second substrate in the MCM, where the second surface faces the first surface and the second substrate overlaps the first optical coupler, selectively receives the optical signal (operation 514). Note that the first optoelectronic device has an eigenmode in a direction perpendicular to the second surface.

Figure 6:
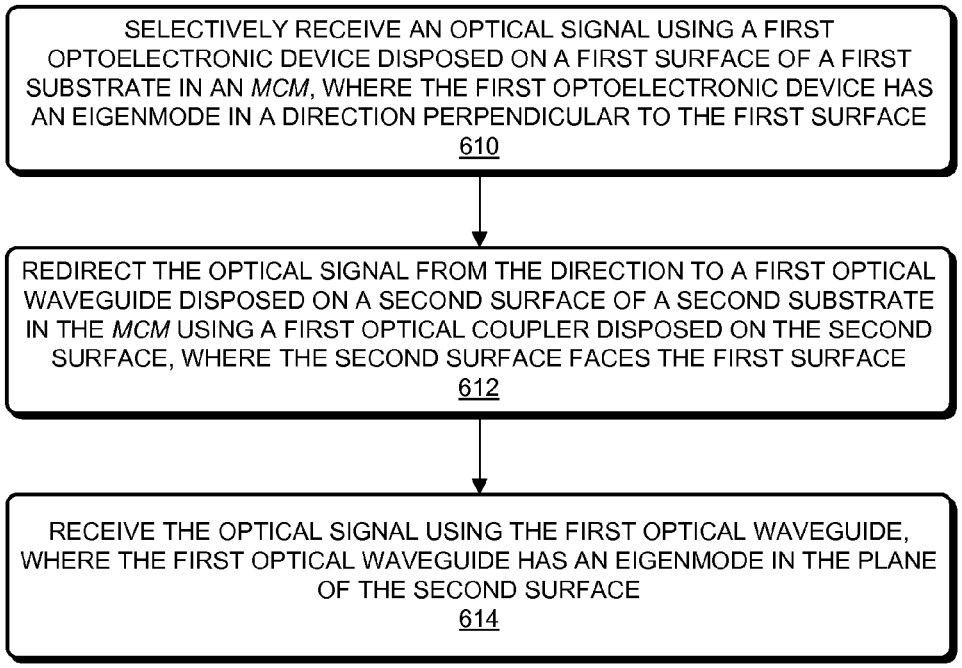
FIG. 6 is a flow chart illustrating a process for selectively providing an optical signal using an MCM in accordance with an embodiment of the present disclosure.

FIG. 6 presents a flow chart illustrating a process 600 for selectively providing an optical signal using an MCM, such as MCM 200 (FIG. 2) or MCM 300 (FIG. 3). During operation, a first optoelectronic device disposed on a first surface of a first substrate in the MCM selectively provides an optical signal (operation 610). Note that the first optoelectronic device has an eigenmode in a direction perpendicular to the first surface. Then, a first optical coupler, disposed on a second surface of a second substrate in the MCM, redirects the optical signal from the direction to a first waveguide disposed on the second surface (operation 612), where the second surface faces the first surface. This first waveguide has an eigenmode in the plane of the second surface. Next, the first optical waveguide receives the optical signal (operation 614).

In some embodiments of processes 500 (FIG. 5) and 600, there are additional or fewer operations. Moreover, the order of the operations may be changed, and/or two or more operations may be combined into a single operation.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A multi-chip module (MCM), comprising:
  a first substrate having a first surface, wherein, disposed on the first surface, the first substrate includes:
    a first optical waveguide having a first eigenmode in the plane of the first surface; and
    a first optical coupler, optically coupled to the first optical waveguide, configured to redirect an optical signal from the first optical waveguide to a direction normal to the first surface, or from the direction normal to the first surface to the first optical waveguide; and
  a second substrate having a second surface, which faces the first surface and which overlaps the first optical coupler, configured to selectively receive the optical signal from the first optical coupler, or to selectively provide the optical signal to the first optical coupler using a first optoelectronic device having a second eigenmode in a direction perpendicular to the second surface.

2. The MCM of claim 1, wherein the first optoelectronic device includes a quantum-well device.

3. The MCM of claim 2, wherein the quantum-well device includes an electro-absorption device.

4. The MCM of claim 2, wherein the quantum-well device includes a quantum confined Stark effect (QCSE) device.

5. The MCM of claim 2, wherein the quantum-well device includes layers of germanium (Ge) separated by silicon-germanium (SiGe) layers.

6. The MCM of claim 1, wherein the first substrate includes silicon.

7. The MCM of claim 6, wherein the first optical waveguide is fabricated using a silicon-on-insulator process technology.

8. The MCM of claim 1, wherein the second substrate includes silicon.

9. The MCM of claim 8, wherein the second substrate includes a semiconductor process technology other than a silicon-on-insulator process technology.

10. The MCM of claim 1, wherein the first optical coupler includes a mirror.

11. The MCM of claim 1, wherein the first optical coupler includes a diffraction grating.

12. The MCM of claim 1, wherein, disposed on the first surface, the first substrate includes:
   a second optical waveguide having a third eigenmode in the plane of the first surface; and
   a second optical coupler, optically coupled to the second optical waveguide, configured to redirect the optical signal from the direction normal to the first surface to the second optical waveguide, or from second optical waveguide to the direction normal to the first surface; and
   wherein the second substrate overlaps the second optical coupler, and is configured to selectively optically couple the optical signal from the first optical coupler to the second optical coupler, or from the second optical coupler to the first optical coupler using the first optoelectronic device.

13. The MCM of claim 12, wherein a given optical coupler, which can be the first optical coupler or the second optical coupler, includes a mirror.

14. The MCM of claim 12, wherein a given optical coupler, which can be the first optical coupler or the second optical coupler, includes a diffraction grating.

15. The MCM of claim 12, wherein the MCM facilitates selective intra-chip communication on the first substrate.

16. The MCM of claim 12, wherein, disposed on the first surface, the first substrate includes a third optical coupler optically coupled to the second optical waveguide at an opposite end of the optical waveguide than the second optical coupler;
   wherein the third optical coupler is configured to redirect the optical signal from the second optical waveguide to the direction normal to the first surface, or from the direction normal to the first surface to the second optical waveguide; and
   wherein the MCM includes a third substrate having a third surface, which faces the first surface and which overlaps the third optical coupler, configured to selectively receive the optical signal from the third optical coupler, or to selectively provide the optical signal to the third optical coupler using a second optoelectronic device having a fourth eigenmode in a direction perpendicular to the third surface.

17. The MCM of claim 1, wherein the first optoelectronic device includes an optical detector.

18. The MCM of claim 1, wherein the MCM facilitates selective inter-chip communication between the first substrate and the second substrate.

19. A system, comprising a MCM, wherein the MCM includes:
   a first substrate having a first surface, wherein, disposed on the first surface, the first substrate includes:
      a first optical waveguide having a first eigenmode in the plane of the first surface; and
      a first optical coupler, optically coupled to the first optical waveguide, configured to redirect an optical signal from the first optical waveguide to a direction normal to the first surface, or from the direction normal to the first surface to the first optical waveguide; and
   a second substrate having a second surface, which faces the first surface and which overlaps the first optical coupler, configured to selectively receive the optical signal from the first optical coupler, or to selectively provide the optical signal to the first optical coupler using a first optoelectronic device having a second eigenmode in a direction perpendicular to the second surface.

20. A method for selectively receiving an optical signal, comprising:
   receiving an optical signal via a first optical waveguide disposed on a first surface on a first substrate of an MCM, wherein the first optical waveguide has a first eigenmode in the plane of the first surface;
   redirecting the optical signal from the first optical waveguide to a direction normal to the first surface using a first optical coupler disposed on the first surface; and
   selectively receiving the optical signal at a second substrate in the MCM having a second surface using a first optoelectronic device disposed on the second surface, wherein the second surface faces the first surface;
   wherein the second substrate overlaps the first optical coupler; and
   wherein the first optoelectronic device has a second eigenmode in a direction perpendicular to the second surface.

* * * * *